United States Patent Office 3,634,343
Patented Jan. 11, 1972

3,634,343
PROCESS OF MAKING AN EPOXIDE RESIN
CELLULAR PLASTIC
Alfred Kuhlkamp, Hofheim, Taunus, and Edgar Fischer and Ernst Nolken, Frankfurt am Main, Germany, assignors to Farbwerke Hoechst Aktiengesellschaft vormals Meister Lucius & Bruning, Frankfurt am Main, Germany
No Drawing. Filed Aug. 8, 1968, Ser. No. 751,073
Claims priority, application Germany, Aug. 23, 1967, F 53,307
Int. Cl. C08f 47/10; C08j 1/26
U.S. Cl. 260—2.5 EP  5 Claims

ABSTRACT OF THE DISCLOSURE

Process for the manufacture of cellular plastics by curing epoxide resins with a mixture of Lewis acids with at least one phosphorus compound of the formula (I)
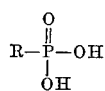

or (II)
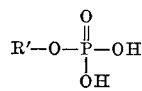

in which R and R' each represents an alkyl, aryl, cycloalkyl, alkylaryl, aralkyl, alkoxyalkyl, alkoxyaryl, oxalkyl, oxaryl, or alkenyl group, in the presence of inert liquid blowing agents and cell regulators. The cellular plastics obtained have uniform cells and no cracks in the interior.

---

The present invention relates to cellular plastics and to their manufacture by curing epoxide resins with Lewis acids and phosphonic acids or phosphoric acid monoesters.

It is known to produce cellular plastics from epoxide resins with the addition of inert blowing agents, cell regulators and catalytic curing agents, such as tin tetrachloride and boron trifluoride, as well as the complex compounds thereof with ethers, alcohols, carboxylic acids or amines. As curing agents in the foaming of epoxide resins there have also been proposed amines, polyvalent phenols, phosphoric acid, polycarboxylic acids and the anhydrides thereof. It has also been proposed to cure epoxide resins by means of phosphonic acids and phosphoric acid monoesters.

When phosphoric acid, phosphoric acid monoesters or phosphonic acids are used as curing agents, cellular plastics having a poor mechanical strength are obtained in foaming liquid epoxide resins with the addition of liquid blowing agents and cell regulators. On the other hand, cellular plastics produced with the aid of boron fluoride complex compounds with ethers, alcohols or weakly basic aromatic amines have the undesired property to shrink or to form cracks.

It is the object of the present invention to overcome the aforesaid disadvantages.

The present invention provides a process for the manufacture of cellular plastics by curing epoxide resins in the presence of inert liquid blowing agents and cell regulators, which comprises using as curing agent a mixture consisting of a Lewis acid with at least one phosphorus compound of the general formula (I)
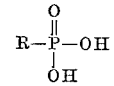

or (II)
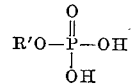

in which R and R' each stand for an alkyl group containing 1 to 10, preferably 1 to 5 carbon atoms; or an aryl group, for example a phenyl group; or a cycloalkyl group, for example a cyclohexyl group; or an alkylaryl group, for example a methylphenyl group; or an arylalkyl group, for example a phenylmethyl or benzyl group; or an alkoxyalkyl group, for example a methoxymethyl group; or an alkoxyaryl group, for example an ethoxyphenyl group; or a hydroxyalkyl group, for example a hydroxyethyl group; or a hydroxyaryl group, for example a hydroxyphenyl group; or a hydroxyaralkyl group, for example an α-hydroxybenzyl group; or an alkenyl group, for example a vinyl group, the aforesaid groups possibly being substituted by halogen atoms, preferably chlorine or bromine atoms.

Suitable phosphorus compounds are, for example, vinyl-, methyl-, ethyl-, 2-chloroethyl-, 1,2-dichloroethyl-, propyl-, butyl-, hydroxymethyl-phosphonic acid, 1 - hydroxyethyl-phosphonic acid, 2 - hydroxypropane-2-phosphonic acid, α-hydroxybenzyl-phosphonic acid, phenyl-phosphonic acid; or monoalkyl- monocycloalkl- and monoaryl-esters of phosphoric acid, for example the methyl-, ethyl-, propyl-, isopropyl-, n-butyl-, isobutyl-, tert-butyl,- methoxyethyl-, butoxyethyl-, phenyl-, 2-methylphenyl-, 3-methylphenyl-, 2,4,6-trichlorophenyl-, or 2,4,6-tribromophenyl-ester. Especially good results are obtained with phosphoric acid monomethyl ester and phosphonic acids, preferably vinyl-phosphonic acids and alkyl-phosphonic acids.

The phosphoric acid monoesters may be contaminated with a lesser or larger proportion of the corresponding diester as obtained in the reaction of phosphorus pentoxide with alcohols or phenols. The aforesaid phosphonic acids and phosphoric acid monoesters can be used in an amount up to the equivalent amount, calculated on the epoxide resin, that is to say one hydroxy equivalent of the phosphorus compound for each epoxide equivalent. To obtain cellular plastics with satisfactory properties it proved advantageous, however, to use the phosphorus compounds in amounts below equivalent, preferably 0.2 to 0.6 hydroxy equivalent per epoxide equivalent.

As catalysts, which are used in combination with the aforesaid phosphorus compounds as curing agents, there are mentioned Lewis acids, such as boron trifluoride, tin tetrachloride, antimony pentachloride, phosphorus pentachloride, and antimony pentafluoride, preferably the addition compounds of boron trifluoride with aromatic amines having a $pK_b$ value of 9 to 16, for example diphenyl amine, 2,4-dichloroaniline, 2-chloroaniline, 3-chloroaniline, o-phenylene diamine, and p-aminobenzoic acid ethyl ester. The use of the aforesaid complex compounds of boron trifluoride with aromatic amines is especially advantageous because the pot life of the mixture to be foamed can be regulated by the basicity of the amine. The complex compounds of boron trifluoride with aromatic amines are substances that are solid at room temperature. To facilitate their handling they may be used in the form of solutions in ethers, such as diethyl ether, diisopropyl ether, dioxane, ethylene glycol dimethyl ether, diethyleneglycol dimethyl ether, and diethylene glycol diethyl ether; or in alcohols such as methanol, ethanol, n-propanol, i-propanol, butyl alcohol, hexyl alcohol, diethylene glycol monobutyl ether, ethylene glycol, diethylene glycol, triethylene glycol and butanediol-1,4; or in ketones such as acetone, methylethylketone, and methylisobutylketone; and in weakly basic aromatic amines, such as 2-chloroaniline, or 3-chloroaniline. The specified liquids may also be used as solvents or complexing agents for the aforesaid catalysts that are gaseous at room temperature, for example boron trifluoride or phosphorus pentafluoride. Alternatively, the phosphorus compounds used according to the invention may serve as solvents for the Lewis acids catalyzing the curing of the epoxide resins.

The catalysts are generally used in an amount in the range of from 0.01 to 5, preferably 0.1 to 3 mol percent, calculated on the average epoxide equivalent of the resin used. When the catalyst is used in the form of a solution it preferably contains 10 to 50% of catalyst, calculated on the weight of the solution.

By the process of the invention epoxide resins are foamed having several, preferably 2 to 10 epoxy groups in the molecule, for example reaction products of epichlorohydrin with polyhydric alcohols, advantageously 2,2-bis(4-hydroxyphenyl)-propane and especially with mono- and polynuclear, polyhydric phenols. It is likewise possible to use di- and polyglycidyl esters. For foaming there may also be used compounds obtained by introducing epoxy groups into di- and polyolefins, dienes, cyclic dienes and diolefinically unsaturated carboxylic acid esters. Alternatively, telomers and cotelomers containing glycidyl ether and/or glycidyl ester groups may be used. Still further, it is possible to replace 1 to 60% by weight, preferably 5 to 30% by weight of the epoxide resins by other cationically polymerizable compounds. Compounds of this type are, for example, cyclic ethers such as propylene oxide epichlorohydrin, phenylglycidyl ether, 3,3-bis(chloromethyl)-oxacyclobutane, trioxan and tetrahydrofurane. Cyclic acetals or lactones may also be used. It is advantageous to foam epoxide resins that are liquid at room temperature and contain 100 to 300 epoxy equivalents. It is likewise possible to use solid epoxide resins or resins having higher epoxy equivalents provided that they can be obtained in the liquid state by adding solvents or comonomers.

Foaming of the epoxide resins is carried out in known manner by adding readily vaporizable halohydrocarbons or hydrocarbons such as monofluorotrichloromethane, monofluorodichloromethane, 1,2,2 - trifluorotrichloroethane, 1,2 - dichlorotetrafluoroethane, methylene chloride or pentane. The blowing agent is used in an amount from 5 to 30% by weight, calculated on the epoxide resin.

In order to produce cellular plastics with cells as uniform as possible it is advantageous to add silicone oils as cell regulators. To the mixture to be foamed there may also be added fillers, dyestuffs, plasticizers or flameproofing agents. The foam formation sets in at room temperature after the addition of the mixture of phosphorus compound and Lewis acid to the epoxide containing the blowing agent and cell regulator. The components to be mixed may have identical or different temperatures in the range of from 5 to 45° C., preferably 10 to 35° C.

Foaming is brought about by stirring the mixture consisting of epoxide resin, blowing agent and silicone oil with the solution of the catalyst in the phosphoric acid derivative, if desired with the addition of a further solvent, either by hand or in suitable machines, for example by injection moulding or in given moulds. Alternatively, to the solution of the curing agent the cell regulator and blowing agent may be added and the whole may be mixed with the liquid epoxide resin. For mixing a simple mechanical stirring device can be used or the components can be mixed in foaming machines. Normally, the mixture is stirred for 20 seconds to 3 minutes until foaming commences and after this period of time the mixture is sufficiently homogeneous. The foam is then transferred into a mould or on a running belt. The pot life of the foam mixture depends on the epoxide resin used, the catalyst and the starting temperature of the individual components. In general, foaming is terminated after 20 seconds to 10 minutes. The subsequent cross-linking reaction yielding the rigid foam is substantially terminated after 5 minutes to 1 hour, even at room temperature.

As compared with epoxide resin cellular plastics produced by a known process the cellular plastics obtained by the process of the invention are distinguished by especially good processing properties, uniformity of the cells, good mechanical properties and by a low tendency to form cracks in the interior. A special advantage resides in the fact that it is also possible to foam epoxide resins of low viscosity.

Owing to the fact that the cross-linking reaction is completed only after the blowing agent has reached its full effect, epoxide resin cellular plastics of especially low unit weights can be produced.

The cellular plastics produced by the process of the invention can be used, for example, as packaging material, in sandwich constructions and as insulation materials against cold, heat, sound and impact, as well as in electrotechnics. They are characterized by an especially good adhesiveness on materials such as steel, aluminum, card board, stone, ceramics and plastic materials.

The following examples serve to illustrate the invention but they are not intended to limit it thereto, the parts being by weight. The product used as epoxide resin was a diglycidyl ether of 2,2 - bis(4 - hydroxyphenyl) - propane having an epoxide equivalent of 190 and a viscosity of 11,800 centipoises at 25° C. The silicone oil used was a commercial product of the Union Carbide Corporation sold under the designation L 531.

EXAMPLE 1 (According to the invention)

A mixture of 1,000 parts of epoxide resin, 10 parts of silicone oil and 150 parts of trichlorofluoromethane was stirred for 3 minutes at 23° C. with a mixture of 7 parts of boron trifluoride/o-chloroaniline complex compound, 7 parts of diglycol dimethyl ether and 28.5 parts of vinylphosphonic acid, and the mixture was poured into a mould. Foaming set in after one minute, after 3 minutes the foam had reached its full height and after another 2 minutes it did no longer stick. A tough cellular plastic with fine cells was obtained which was homogeneous in the interior and had a good abrasion resistance. The compressive strength was 1.9 kg./cm.$^2$ with a density of 37 g./l. 73% of the cells were closed.

Comparative Example 1

A foam was produced as described in the preceding example with the exception that the boron trifluoride/o-chloroaniline complex compound was dissolved in 47.5 parts of hexane-triol-1,3,5 instead of vinyl-phosphonic acid. The foam obtained had large cells, was strongly torn in the interior, little resistant and had a poor abrasion resistance.

Comparative Example 2

A foam was produced as described in comparative Example 1 with 5 parts of boron trifluoride/o-chloroaniline complex compound only.

The foam obtained shrunk to a large extent and was soft.

Comparative Example 3

A mixture of 1,000 parts of epoxide resin, 10 parts of silicone oil and 150 parts of trichlorofluoromethane was stirred with 114 parts of vinyl phosphonic acid. After initial foaming the mixture collapsed entirely.

Comparative Example 4

When the proportion of vinyl-phosphonic acid was increased to 228 parts, the other conditions remaining the same as in comparative Example 3, a homogeneous foam was obtained having fine cells but it shrunk and had no strength.

EXAMPLE 2 (according to the invention)

A mixture of 1,000 parts of epoxide resin, 10 parts of silicone oil and 150 parts of trichlorofluoromethane was stirred at 23° C. within 2.5 minutes with a mixture of 5 parts of boron trifluoride/o-chloroaniline complex compound, 5 parts of diglycol dimethyl ether and 85.5 parts of vinylphosphonic acid and the whole was poured into a mould. Foaming set in at once, the foam rose uniformly and after 3 minutes it had reached its full height. After another minute it was no longer sticky and after 2 hours it could be cut. The foam obtained had fine cells, was homogeneous and tough and did not have cracks in the interior. With a density of 34 g./l. it had a compressive strength of 1.5 kg./cm.² 67% of the cells were closed.

EXAMPLE 3 (according to the invention)

A mixture of 1,000 parts of epoxide resin, 10 parts of silicone oil and 150 parts of trichlorofluoromethane were mixed with a mixture of 41 parts of tin tetrachloride and 114 parts of vinyl-phosphonic acid from which the hydrogen chloride set free had been removed by heating. A foam of a density of 35 g./l. which had fine cells, was tough and free from cracks in the interior was obtained.

EXAMPLE 4 (according to the invention)

1,000 parts of epoxide resin, 10 parts of silicone oil, 150 parts of trichlorofluoromethane, 5 parts of boron trifluoride/o-chloroaniline complex compound and 81 parts of phosphoric acid mono-n-butyl ester were mixed and the mixture was poured into a mould. A cellular plastic having fine cells which was free from cracks, homogeneous and tough was obtained. The product had a good abrasion resistance and a compressive strength of 1.1 kg./cm.² with a density of 33 g./l. 70% of the cells were closed.

What is claimed is:

1. In a process for making cellular plastics by foaming and curing poly-1,2-epoxide resins in the presence of an inert liquid blowing agent and a curing agent, the improvement which comprises using as said curing agent a mixture consisting essentially of a Lewis acid catalyst and a phosphorus compound of the formula

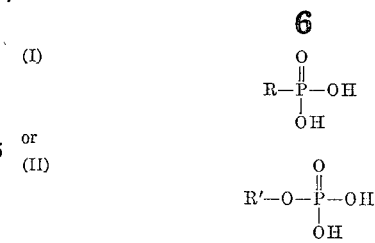

in which R and R' each represents an alkyl group containing 1 to 10 carbon atoms, an aryl, cycloalkyl, alkylaryl, aralkyl, alkoxyalkyl, alkoxyaryl, hydroxyalkyl, hydroxyaryl, hydroxyaralkyl or alkenyl group, which groups may carry halogen atoms as substituents, said Lewis acid being used to the extent of 0.1 to 5 mol percent based on the average epoxide equivalent of the resin and said phosphorus compound being used to the extent of 0.2 to 1.0 hydroxy equivalent per epoxide equivalent of the resin.

2. The process of claim 1, wherein the phosphorus compound is vinyl-, methyl-, ethyl-, 2-chloroethyl-, 1,2-dichloroethyl-, propyl-, butyl-, hydroxymethyl-, 1-hydroxyethyl-, 2-hydroxy-propane-2-, α-hydroxybenzyl-phosphonic acid; methyl-, ethyl-, propyl-, isopropyl-, n-butyl-, isobutyl-, tert-butyl-, methoxyethyl-, butoxyethyl-, phenyl-, 2 - methylphenyl-, 3 - methylphenyl-, 2,4,6-trichlorophenyl-monoester of phosphoric acid.

3. The process of claim 1, wherein the Lewis acid is a complex compound of boron trifluoride with amines having a pK$_b$ value of 9 to 16.

4. The process of claim 1, wherein 0.1 to 3 mol percent of Lewis acid is used, calculated on the average epoxide equivalent of the resin.

5. The process of claim 1, wherein the phosphorus compound is used in an amount such that 0.2 to 0.6 hydroxyl equivalents are present per epoxide equivalent.

References Cited
UNITED STATES PATENTS 3,154,504 10/1964 Carey et al. _____ 260—2.5 EP
3,282,863 11/1966 Carey et al. _____ 260—2.5 EP MURRAY TILLMAN, Primary Examiner M. FOELAK, Assistant Examiner U.S. Cl. X.R.

260—2 EC, 2 XA, 47 EC